3,428,053
PRODUCTION OF RECONSTITUTED TOBACCO
Alexander W. Schoenbaum, John T. Ashworth, and John G. Brooks, Richmond, Va., assignors to The American Tobacco Company, New York, N.Y., a corporation of New Jersey
No Drawing. Filed Oct. 7, 1965, Ser. No. 493,913
U.S. Cl. 131—140                      1 Claim
Int. Cl. A24b 9/00, 15/00; A24f 47/00

ABSTRACT OF THE DISCLOSURE

In the aqueous extraction of tobacco products wherein the fibrous constituents are separated from the resulting aqueous constituents and the aqueous mass is concentrated before returning it to a thin sheet of the fibrous constituent, the characteristic "off" taste of the resulting reconstituted tobacco products is eliminated by separating by centrifuging and then discarding water-insoluble solids from the separated aqueous phase before concentrating this phase for application to the fibrous phase sheet.

---

This invention relates to the production of reconstituted tobacco sheet and, more particularly, to an improved method which produces reconstituted tobacco of superior flavor and quality.

It has long been known, as shown in United States Patents Nos. 21,558, 720,830, 799, 215 and 3,012,915, that reconstituted tobacco can be produced from tobacco plant components by grinding these components, extracting their water-soluble constituents by leaching with water, separating the aqueous phase from the fibrous phase, converting the fibrous phase into a thin sheet either with or without the further addition of extraneous cellulosic fiber to increase the strength of the sheet, concentrating the aqueous phase, thereafter applying the concentrated aqueous phase to the thin sheet of the fibrous phase, and drying the resulting sheet product. In spite of the antiquity of this procedure, it has not produced a wholly desirable product because the flavor of the reconstituted sheet was not equal to the quality of the flavor of the starting material. Numerous variations in grinding, leaching and sheet-forming techniques have failed to completely free the reconstituted sheet from its "off" taste.

We have now discovered that the flavor of reconstituted tobacco sheet produced by the afore-described method can be raised to virtually the same quality level as the starting material by imposing a solids-separation operation upon the aqueous phase before it is concentrated and applied to the thin sheet of fibrous phase components. We have found that the water-soluble solids present in the aqueous phase prior to its concentration are the components that impart an "off" taste to the tobacco sheet when the concentrated aqueous phase is returned to the sheet of fibrous phase components of the tobacco. As in other matters concerning taste, the amount of these solids which is permitted to remain in the aqueous phase without tasting objectionable is variable. Removal of about one-third of these solids results in an improved flavor to those with sensitive taste, but in general we prefer to remove at least about 50% of the water-insoluble solids from the aqueous phase for a significant improvement in the flavor of the final product.

The separation step of the invention is advantageously carried out in any conventional centrifuge. Centrifuges are readily capable of separating from the tobacco extract aqueous phase at least about 75%, and generally at least about 90%, of its water-insoluble solids content. For this reason, we presently prefer to use a centrifuge for the separation operation because the slimy characteristic of these solids complicates their separation by other conventional means such as decantation, bed settling or filtration. However any separating device or procedure can be used in practicing our invention where it can remove from the aqueous liquor a significant amount of the solids constituents that appear to have contributed in the past to the "off" taste of such reconstituted tobacco sheet.

The identity of the thus-separated solids has not been ascertained. In addition to particles of sand or grit and fine particles of the fibrous constituents of the tobacco, these solids appear to contain a denatured proteinaceous material and products of hydrolysis of some water-soluble constituents of the tobacco which approach a colloidal size. This material, when burned, produces a typical protein or burning fat aroma which is objectionable in a smoking product. The sludge, on hydrolysis with hydrochloric acid, yields ten to twelve amino acids. It is presently believed that the sludge also contains carbohydrate compounds, pentoses, galacturonic acids, polyphenols, rutin and the like. Regardless of the uncertainty of the composition of the centrifugally separated solids of the aqueous tobacco extract, it has been clearly established that these separated solids contain the constituent or constituents which have heretofore contributed to the inferior quality of the reconstituted sheet.

We have also observed that the concentrated aqueous tobacco extract phase after removal of these water-insoluble constituents has a greater ability to penetrate the sheet of fibrous components than when the liquor is not freed of them. The increased penetration of the liquor into the sheet makes possible in the final sheet product an increase in its content of the dominant flavoring constituents of the tobacco starting materials. Without an increase in such penetration, an increase in liquor content of the sheet product increases the difficulty in producing a sheet without a tacky surface and thus impairs the handling characteristic of the sheet before and after its completion.

The improvement in flavor of the reconstituted tobacco sheet obtained by practice of the invention is particularly important where the sheet is used as a cigar wrapper. It is known that the burning of a cigarette or cigar is not uniform throughout its cross-section and that the dominant flavor of the smoke is derived from that portion near the periphery. This means that the flavor of a cigar wrapper is significant in the flavor of the cigar smoke and, of course, in the contact flavor of the mouth end of the cigar. The removal of off-taste ingredients in the tobacco liquor component of the reconstituted sheet pursuant to the invention is therefore an important advance in the art.

The following is a representative example of the practice of the invention:

Stems and leaf components of tobacco were passed through an ordering drum to soften these components and thereby prevent excess dust losses during subsequent breaking operation, and the softened components were then broken to the desired size by means of a hammer mill. The broken stems and leaf components were blended with fine tobacco particles in a ratio of about 3 to 1, and the resulting blend of tobacco particle was water extracted in a three-stage counter-current extraction system to produce a dilute aqueous extract containing 6% to 11% solids and an extracted tobacco-pulp stock.

After separation of the dilute extract from the extracted tobacco stock, the extract was passed through a centrifuge where about 90% by weight of its water-insoluble constituents including fine particles of sand and tobacco and a sludge material which approached colloidal size were removed and discarded. The dilute extract was concentrated in a thin film evaporator operating under a vacuum of about 27 inches of mercury to produce a concentrated extract containing between 44% to 50% by weight of water-soluble solids.

The extracted tobacco stock was mixed with fresh water to obtain a sheet pulp of approximately 0.7% consistency suitable for fabrication into a paper-like sheet on a Fourdrinier paper making machine. A paper web was formed on the Fourdrinier wire, and after drying the web to reduce its moisture content to approximately 35% to 40% the sheet was re-combined with the concentrated extract so that the resulting product contained approximately 50% water extractable solids calculated on the dry basis of the final product, thus corresponding to the amount of water-soluble solids present in the tobaccos that entered the system. The wet impregnated sheet was then passed through a tunnel dryer until its moisture content was reduced to the level appropriate for the desired use of the final product. The resulting product was a reconstituted tobacco sheet of superior quality substantially free of the "off" taste which previously has characterized such a product.

We claim:
1. In the method of making reconstituted tobacco sheet by grinding tobacco plant components, extracting water-soluble constituents of the ground tobacco components by leaching with water, separating the aqueous phase from the fibrous phase, converting the fibrous phase into a thin sheet, concentrating the aqueous phase, thereafter applying the concentrated aqueous phase to the thin sheet of the fibrous phase and drying the resulting sheet product, the improvement which comprises subjecting the separated aqueous phase, prior to its concentration to centrifuging of sufficient force to separate at least about 50% by weight of its water-insoluble solids content in the form of a sludge, before concentrating and discarding the said separated solids before the aqueous extract is concentrated and applied to the fibrous phase sheet.

References Cited

UNITED STATES PATENTS

| | | |
|---|---|---|
| 283,622 | 8/1883 | Liebreich et al. |
| 858,289 | 6/1907 | Hondius. |
| 720,830 | 2/1903 | Marsden _____ 131—143 |
| 3,145,717 | 8/1964 | Osborne et al. ____ 131—143 X |

MELVIN D. REIN, *Primary Examiner.*

U.S. Cl. X.R.

131—17

UNITED STATES PATENT OFFICE
CERTIFICATE OF CORRECTION

Patent No. 3,428,053  
February 18, 1969

Alexander W. Schoenbaum et al.

It is certified that error appears in the above identified patent and that said Letters Patent are hereby corrected as shown below:

Column 1, line 52, "water-soluble" should read -- water-insoluble --.

Signed and sealed this 31st day of March 1970.

(SEAL)  
Attest:

Edward M. Fletcher, Jr.  
Attesting Officer

WILLIAM E. SCHUYLER, JR  
Commissioner of Patents